United States Patent
Helton et al.

(10) Patent No.: US 9,415,385 B2
(45) Date of Patent: Aug. 16, 2016

(54) ACTIVATION OF DUAL CATALYST SYSTEMS

(71) Applicant: ExxonMobil Research and Engineering Company, Annandale, NJ (US)

(72) Inventors: Terry E. Helton, Bethlehem, PA (US); Benjamin S. Umansky, Fairfax, VA (US); William J. Tracy, III, Burke, VA (US); Stephen J. McCarthy, Center Valley, PA (US); Timothy L. Hilbert, Fairfax, VA (US); Mohan Kalyanaraman, Media, PA (US); Christopher G. Oliveri, Stewartsville, NJ (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 197 days.

(21) Appl. No.: 13/677,564

(22) Filed: Nov. 15, 2012

(65) Prior Publication Data
US 2013/0130893 A1     May 23, 2013

Related U.S. Application Data

(60) Provisional application No. 61/562,045, filed on Nov. 21, 2011.

(51) Int. Cl.
*B01J 37/20* (2006.01)
*B01J 23/89* (2006.01)
(Continued)

(52) U.S. Cl.
CPC *B01J 37/20* (2013.01); *B01J 23/89* (2013.01); *B01J 23/8993* (2013.01); *B01J 29/0325* (2013.01); *B01J 29/0333* (2013.01); *B01J 29/85* (2013.01); *B01J 29/90* (2013.01); *B01J 38/10* (2013.01); *B01J 38/58* (2013.01); *B01J 38/74* (2013.01); *C10G 45/10* (2013.01); *C10G 45/12* (2013.01); *C10G 65/043* (2013.01); *B01J 29/126* (2013.01); *B01J 29/143* (2013.01); *B01J 29/44* (2013.01); *B01J 29/46* (2013.01); *B01J 29/67* (2013.01); *B01J 29/68* (2013.01); *B01J 29/7415* (2013.01); *B01J 29/7461* (2013.01); *B01J 29/7492* (2013.01); *B01J 29/7615* (2013.01);
(Continued)

(58) Field of Classification Search
None
See application file for complete search history.

(56) References Cited

U.S. PATENT DOCUMENTS 3,644,197 A * 2/1972 Kelley ............... C10G 65/12
                                                              208/254 H
4,458,024 A * 7/1984 Oleck ............... B01J 29/48
                                                              208/111.3

(Continued)

OTHER PUBLICATIONS

"Operating Procedures for Engelhard Pd/Alumina Fixed Bed Catalysts", World Wide Web, (2011), URL: www.coastalchem.com/PDFs/Engelhard/OperatingProceduresForEngelhardPdonAluminaFixedBe.pdf.
(Continued)

*Primary Examiner* — Melvin C Mayes
*Assistant Examiner* — Colette Nguyen
(74) *Attorney, Agent, or Firm* — Larry E. Carter; Chad A. Guice; David M. Weisberg

(57) ABSTRACT

Methods are provided for liquid phase activation of dewaxing and/or hydrofinishing catalysts that include a molecular sieve or other acidic crystalline support. The methods are compatible with activating the catalysts as part of a catalyst system that also includes a hydrotreating catalyst.

20 Claims, 3 Drawing Sheets

(51) Int. Cl.

| | | |
|---|---|---|
| *C10G 65/04* | (2006.01) | |
| *C10G 45/10* | (2006.01) | |
| *C10G 45/12* | (2006.01) | |
| *B01J 38/10* | (2006.01) | |
| *B01J 38/58* | (2006.01) | |
| *B01J 38/74* | (2006.01) | |
| *B01J 29/03* | (2006.01) | |
| *B01J 29/85* | (2006.01) | |
| *B01J 29/90* | (2006.01) | |
| *B01J 29/12* | (2006.01) | |
| *B01J 29/14* | (2006.01) | |
| *B01J 29/44* | (2006.01) | |
| *B01J 29/46* | (2006.01) | |
| *B01J 29/67* | (2006.01) | |
| *B01J 29/68* | (2006.01) | |
| *B01J 29/74* | (2006.01) | |
| *B01J 29/76* | (2006.01) | |

(52) U.S. Cl.
CPC ........... *B01J 29/7661* (2013.01); *B01J 29/7692* (2013.01); *B01J 2229/42* (2013.01); *C10G 2300/4031* (2013.01); *C10G 2300/703* (2013.01)

(56) References Cited

U.S. PATENT DOCUMENTS

| | | |
|---|---|---|
| 5,951,848 A | 9/1999 | Baker, Jr. et al. |
| 5,986,158 A | 11/1999 | Van Broekhoven et al. |
| 6,218,333 B1 * | 4/2001 | Gabrielov ................ B01J 23/75 502/216 |
| 6,281,158 B1 * | 8/2001 | Gabrielov ................ B01J 23/75 502/216 |
| 7,125,818 B2 | 10/2006 | Cody et al. |
| 7,220,350 B2 | 5/2007 | Cody et al. |
| 2004/0108244 A1 * | 6/2004 | Cody ..................... B01J 29/064 208/27 |
| 2004/0108247 A1 | 6/2004 | Cody et al. |
| 2006/0252632 A1 | 11/2006 | Cody et al. |
| 2007/0068850 A1 | 3/2007 | Cody et al. |

OTHER PUBLICATIONS

"OleMax 450 Catalyst for C4/C5 Selective and Total Hydrogenation", Sud-Chemie OleMax 450 Technical Bulletin, (2007).

The International Search Report and Written Opinion of PCT/US2012/065504 dated Feb. 14, 2013.

\* cited by examiner

ACTIVATION OF DUAL CATALYST SYSTEMS

CROSS-REFERENCE TO RELATED APPLICATION

This application claims the benefit of U.S. Provisional Application Ser. No. 61/562,045 filed Nov. 21, 2011, which is incorporated herein in its entirety by reference.

FIELD OF THE INVENTION

This invention relates to activation of catalyst systems that include a hydrotreatment catalyst and another type of catalyst, such as a dewaxing catalyst.

BACKGROUND OF THE INVENTION

A wide variety of catalysts are employed at various locations in a refinery. Hydrotreating catalysts allow for removal of contaminants such as sulfur and nitrogen from feedstocks. Dewaxing and hydrocracking catalysts allow for modification of boiling point and/or cold flow properties of feeds. Hydrofinishing catalysts allow for addition of hydrogen to unsaturated functional groups in a feedstock. For many types of catalysts, the state of the fresh catalyst when shipped by the manufacturer does not correspond to the desired state for the catalyst during hydroprocessing. In order to prepare the catalyst for use or "activate" the catalyst, a variety of procedures have been employed.

One of the difficulties in activation of catalysts occurs when multiple types of catalysts are present in a single reactor or reactor train. For example, it may be desirable to have a reactor or reactor train that contains one or more initial beds of a hydrotreatment catalyst followed by one or more beds of a dewaxing catalyst. A typical hydrotreatment catalyst often includes Group VI and Group VIII metals on a refractory support, such as cobalt-molybdenum or nickel-tungsten on alumina. The metals on a hydrotreating catalyst are typically sulfided for use during a hydrotreatment process. By contrast, many dewaxing catalysts include a Group VIII noble metal, such as Pt, Pd, or bimetallic combinations of Pt and Pd, on a support having a higher acidity than an amorphous alumina or other refractory support. Examples of acidic supports include zeolites and supports from the M41S family of supports. The Group VIII noble metals in such dewaxing catalysts are typically poisoned by the presence of sulfur, leading to a lower overall reactivity. As a result, a feed containing a sufficient amount of sulfur to assist with sulfiding the Group VI and Group VIII metals on a hydrotreating catalyst is potentially a feed that will reduce the activity of a Group VIII noble metal dewaxing catalyst.

U.S. Pat. No. 7,220,350 describes methods for selectively activating a dewaxing catalyst using a feed that contains, for example, at least 100 wppm of an oxygenate. The dewaxing catalysts include catalysts having Group VI and Group VIII metals, with Group VIII noble metals being indicated as specific example. As dewaxing catalysts with a wide variety of metals are described, it is noted that the dewaxing catalysts can be either sulfided or unsulfided prior to being exposed to oxygenate. It is noted that the examples describe using a catalyst with Pt supported on a ZSM-48 zeolite in a reduced state, as opposed to a sulfided state.

SUMMARY OF THE INVENTION

In an embodiment, a method for activating a catalyst system is provided. The method includes exposing a catalyst system to a first liquid activation feed under effective reducing conditions, the catalyst system including at least one catalyst with an amorphous support and at least one catalyst that includes a Group VIII noble metal on an acidic support, the effective reducing conditions including a hydrogen partial pressure of at least about 500 psig (3.45 MPag) and a temperature of at least about 200° C.; and exposing the catalyst system to a second liquid activation feed under effective sulfiding conditions.

In another embodiment, a method for activating a catalyst system is provided. The method includes exposing a catalyst system to a first liquid activation feed under effective reducing conditions for at least about 24 hours, the catalyst system including at least one catalyst that comprises a Group VIII metal on an amorphous support, a dewaxing catalyst that comprises a Group VIII noble metal on a molecular sieve, and a hydrofinishing catalyst comprising a Group VIII noble metal on an acidic crystalline support, the effective reducing conditions including a hydrogen partial pressure of at least about 500 psig (3.45 MPag) and a temperature of at least about 200° C.; and exposing the catalyst system to a second liquid activation feed under effective sulfiding conditions.

DETAILED DESCRIPTION OF THE PREFERRED EMBODIMENTS

Figure 1:
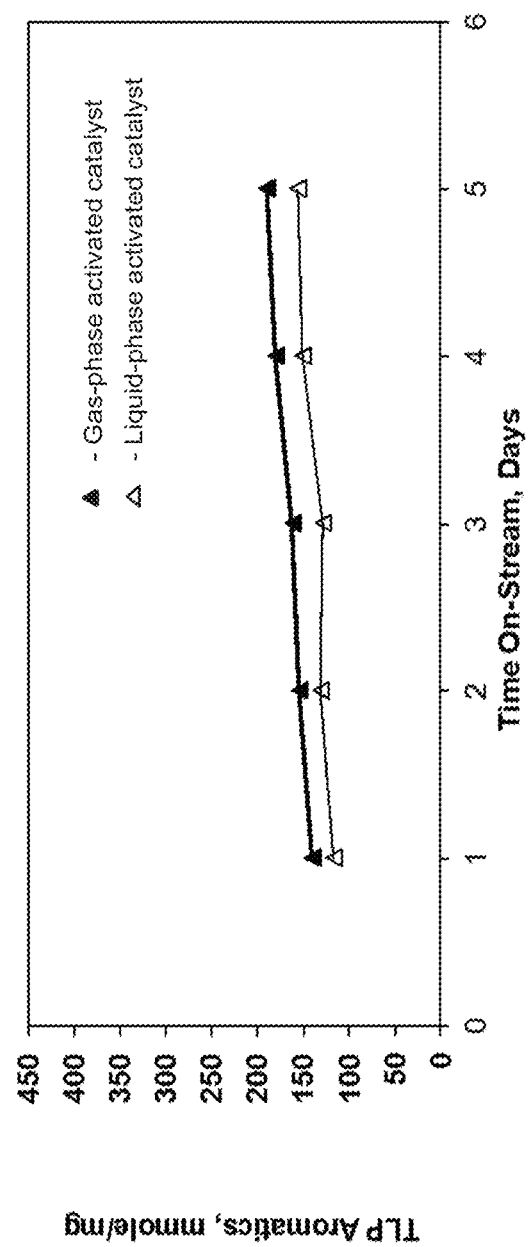
FIG. 1 shows results from aromatic saturation of a feed using catalysts activated by various procedures.

In various embodiments, systems and methods are provided for activating catalysts composed of one or more Group VIII noble metals on an acidic support. Some embodiments are also suitable for activating a conventional hydrotreating catalyst and a Group VIII noble metal dewaxing or hydrofinishing catalyst that are located in the same reactor or reaction stage. The systems and methods allow for effective activation of the catalysts containing Group VIII noble metal(s) on an acidic support under conditions that are easier to control in a typical refinery setting.

In an embodiment, a catalyst including one or more Group VIII noble metals on an acidic support is provided in a reactor or reaction stage. The reactor or reaction stage optionally includes a conventional hydrotreating catalyst. The catalysts are first exposed to a liquid feed under conditions effective for drying the catalyst system. The catalyst(s) in the reactor or reaction stage are the exposed to a liquid activation feed under conditions effective for reducing the metals on the Group VIII noble metal catalyst. This can include exposing the catalyst(s) to a liquid activation feed in the presence of hydrogen gas. The liquid activation feed can be a feed that contains sufficiently low amounts of sulfur, nitrogen, and/or water. The catalyst(s) optionally can then be exposed to a liquid activation feed under conditions effective for sulfiding a catalyst, such as sulfiding a hydrotreating catalyst. The conditions effective for sulfiding a catalyst include a temperature that is greater than the temperature during reduction of the metals on the Group VIII noble metal catalyst. The liquid activation feed for sulfidation can be the same or different than the liquid activation feed for reduction. During sulfidation, the liquid activation feed can have a sulfur content greater than a desired amount, either due to spiking of the liquid activation feed or due to other sulfur present in the feed.

The goal of a catalyst activation process is to convert a catalyst from a form that is stable for shipping to a form that is active for a desired type of processing in a refinery. In catalysts intended for use for hydrocracking, dewaxing, or hydrofinishing, Group VIII noble metal catalysts are often supported using a molecular sieve or other crystalline support. Zeolites and silicoaluminophosphates are examples of molecular sieves while an M41S type material is an example of a crystalline support material that is not a molecular sieve. These molecular sieve or other crystalline support materials can be referred to as acidic supports, as they are acidic relative to refractory oxide supports.

In general, catalyst activation refers to a process where a catalyst is optionally dried and then exposed to one or more activation reagents under a temperature and/or pressure profile. For a hydrotreating catalyst containing a non-noble Gr VIII metal, one of the activation reagents is usually a sulfur containing compound such as $H_2S$ or dimethyl disulfide (DMDS). This allows for conversion of metals on the hydrotreating catalyst from an oxide form to a sulfide form. For a Group VIII noble metal catalyst, hydrogen is typically used as an activating reagent in order to reduce the oxidation state of the noble metals. Hydrogen is often used as an activating reagent for hydrotreatment catalysts as well. Additionally, some noble metal catalysts are at least partially sulfided for use in hydroprocessing.

An activation process can be performed as either gas phase activation or liquid phase activation. In a liquid phase activation process, the catalyst is exposed to a liquid feed, such as a previously hydrotreated and/or dewaxed feed. The activation reagents can be dissolved in the feed, or the reagents can be introduced as a gas phase and allowed to diffuse through the liquid feed to reach the metal on the catalyst. The temperature during activation is often constrained, as a sufficiently high temperature can cause metal on a support to agglomerate. Typically, catalyst activity is higher for metals that are well-dispersed, on a catalyst support as opposed to metals that have agglomerated. The presence of water vapor during catalyst activation can also contribute to agglomeration.

When temperature control is the only concern, a liquid phase activation procedure may be preferable to a gas phase activation procedure. In gas phase activation, all of the reagents introduced into a reaction system are gases. Gases have low heat capacities relative to condensed phases. As a result, any heat generated during activation may be difficult to control and/or transport away. This problem is compounded by the fact that most reactors are designed for temperature control of condensed phases, and are not designed to handle the potentially rapid temperature changes that can occur due to the low heat capacities for gases. By contrast, liquid phase activation procedure provides a flowing liquid condensed phase that can facilitate heat transport. Liquid phase flow volumes during activation are usually sufficient to allow the temperature control mechanisms for the reactor to handle any temperature changes during an activation procedure. Additionally, use of a hydrocarbon stream as the activation feed can reduce or minimize the amount of water present, which can help in avoiding agglomeration of metals on the catalyst.

In spite of the advantages of liquid phase activations, conventionally, Group VIII noble metal catalysts on acidic supports have been activated using a gas phase activation method for various reasons. One concern is the ability of hydrogen to pass through a liquid activation feed to reach the Group VIII metal. For activation of the catalyst to occur, the hydrogen or other gas phase reagents must diffuse through the liquid activation feed in order to reach the surface of the catalyst. The hydrogen can only then interact with the metals on the catalyst surface. A problem believed to be associated with using a liquid phase reduction is that the amount of hydrogen dissolved into the liquid activation feed is limited, based on relations such as Henry's Law, which provides an equilibrium concentration for a dissolved gas in a liquid based on the partial pressure of the gas above the liquid. Separate from the equilibrium amount of gas dissolved in the activation feed, transport of the gas by diffusion to the catalyst surface is also of concern. Due to these factors, it has been believed that liquid phase activations result in lower amounts of gas phase activation reagents reaching a catalyst surface. As such, strictly gas-phase activation of noble metal dewaxing catalysts has been specified and used in the industry for catalyst reduction.

Still another difficulty with activating dewaxing catalysts arises in situations where the dewaxing catalyst is located in the same reactor as a hydrotreating catalyst. Performing separate gas phase activation on the dewaxing catalyst is costly and time consuming. However, it is conventionally believed that the sulfidation conditions for the hydrotreating catalyst are not suitable for activation of the dewaxing catalyst. This poses a problem for activation and startup of the catalyst systems when both the hydrotreating catalyst, containing a non-noble Group VII metal, and a dewaxing catalyst, containing a Group VIII noble metal or located in the same process circuit/system, or even worse, when they are located in the same reactor.

In various embodiments, methods are provided for liquid phase activation of metals on acidic catalysts, such as catalyst including zeolites or other acidic crystalline materials. The methods are suitable for use in hydroprocessing systems where a hydrotreating catalyst that requires sulfidation is located in the same circuit, or same reactor, as an acidic catalyst, such as a dewaxing catalyst. The methods allow catalyst activation (including sulfidation) to be performed for the two catalyst system within the same circuit or reactor, without requiring separate ex-situ or other gas phase processing for the acidic catalyst.

Feedstocks

During liquid phase catalyst activation, the catalyst being activated is exposed to a hydrocarbon feed and usually at least one additional gas, such as hydrogen gas. One option for a hydrocarbon feed for liquid phase catalyst activation is to select a feed based on the expected use of the catalyst during normal operation. For example, it may be desirable to treat a vacuum gas oil feed with a hydrotreating catalyst to remove sulfur and nitrogen, followed by treating the feed with a dewaxing catalyst to improve the cold flow properties of the resulting product. One option for an activation feed in this situation would be to use a previously hydroprocessed vacuum gas oil of a similar type.

More generally, a mineral feedstock (such as a mineral hydrocarbon feedstock) refers to a feedstock derived from crude oil that has optionally been subjected to one or more separation and/or other refining processes. In some preferred embodiments, the mineral (hydrocarbon) feedstock is a petroleum feedstock boiling in the diesel range or above. Examples of suitable feedstocks include virgin distillates, hydrotreated virgin distillates, kerosene, diesel boiling range feeds (such as hydrotreated diesel boiling range feeds), light cycle oils, atmospheric gas oils, and vacuum gas oils.

Diesel boiling range feedstocks (or other distillate fuel boiling range feedstocks) suitable for use in the present invention boil within the range of about 215° F.' to about 800° F. Preferably, the diesel boiling range feedstock has an initial boiling point of at least 250° F., or at least 300° F., or at least 350° F., or at least 400° F., or at least 451° F. Preferably, the diesel boiling range feedstock has a final boiling point of 800° F. or less, or 775° F. or less, or 750° F. or less. In an embodiment, the diesel boiling range feedstock has a boiling range of from 451° F. to about 800° F. In another embodiment, the diesel boiling range feedstock also includes kerosene range compounds to provide a feedstock with a boiling range of from about 250° F. to about 800° F.

Typical mineral feedstocks for production of distillate fuels can have a nitrogen content from about 50 to about 2000 wppm nitrogen, preferably about 50 to about 1500 wppm nitrogen, and more preferably about 75 to about 1000 wppm nitrogen. In an embodiment, feedstocks suitable for use herein have a sulfur content from about 100 wppm sulfur to about 10,000 wppm sulfur, preferably about 200 wppm sulfur to about 5,000 wppm, and more preferably about 350 wppm sulfur to about 2,500 wppm sulfur. In another embodiment, the combined biocomponent and mineral feedstock can have a sulfur content of at least about 5 wppm, or at least about 10 wppm, or at least about 25 wppm, or at least about 100 wppm, or at least about 500 wppm, or at least about 1000 wppm.

In yet another embodiment, the combined feedstock can have a sulfur content of about 2000 wppm or less, or about 1000 wppm or less, or about 500 wppm or less, or about 100 wppm or less, or about 50 wppm or less. In another embodiment, the nitrogen content of the combined feedstock can be about 1000 wppm or less, or about 500 wppm or less, or about 100 wppm or less, or about 50 wppm or less, or about 10 wppm or less.

Alternatively, a feed with a higher amount of sulfur and nitrogen contaminants may be the desired feed for processing in a reactor. For example, feeds based on vacuum gas oils often contain higher levels of contaminants, iii such embodiments, a suitable mineral feedstock can be a feedstock with an initial boiling point of at least about 650° F. (343° C.), or at least about 700° F.' (371° C.), or at least about 750° F. (399° C.). Alternatively, the feedstock can be characterized by the boiling point required to boil a specified percentage of the feed. For example, the temperature required to boil at least 5 wt. % of a feed is referred to as a "T5" boiling point. In an embodiment, the mineral feedstock can have a T5 boiling point of at least about 700° F. (37 PC), or at least about 725° F. (385° C.). In another embodiment, the mineral feedstock can have T95 boiling point of about 1150° F. (621° C.) or less, or about 1100° F. (593° C.) or less, or about 1050° F. (566° C.) or less. Alternatively, the mineral hydrocarbon feed can have a final boiling point of about 1200° F. (649° C.) or less, or about 1150° F. (621° C.) or less, or about 1100° F. (593° C.) or less, or about 1050° F. (566° C.) or less. The percentage of a feedstock that boils above 700° F. (370° C.) can be at least about 85%, or at least about 90%, or at least about 95%. Such mineral feedstocks can have a nitrogen content from about 50 to about 2000 wppm nitrogen, preferably about 50 to about 1500 wppm nitrogen, and more preferably about 75 to about 1000 wppm nitrogen. In an embodiment, feedstocks suitable for use herein can have a sulfur content from about 100 to about 50,000 wppm sulfur, preferably about 200 to about 30,000 wppm, and more preferably about 350 to about 10,000 wppm.

One impact of using a previously hydroprocessed feed of a similar type as a feed for liquid phase activation is that the sulfur content of the previously hydroprocessed feed will typically be lower than the correspond feed without hydroprocessing. For example, a feedstock suitable for use as an activation feed (such as a previously hydroprocessed feed) can have a sulfur content of about 1000 wppm or less, or about 750 wppm or less, or about 500 wppm or less, or about 250 wppm or less. In other embodiments, an activation feed can be used that has a still lower sulfur content, such as about 100 wppm or less, or about 50 wppm or less, or about 20 wppm or less, or about 10 wppm or less. The amount of sulfur in the activation feed can represent a balance between one or more competing considerations. If a catalyst with supported precious metals is being activated, lower sulfur contents are beneficial to avoid excessive poisoning of the catalyst. However, if a hydrotreatment catalyst is being activated using the same activation feed, a minimum amount of sulfur in the feed may be beneficial in order to sulfide the metals on the hydrotreatment catalyst. This type of balancing can lead to selection of an activation feed that has at least about 50 wppm of sulfur, or at least about 100 wppm, or at least about 200 wppm.

The nitrogen content of an activation feed can also be reduced as compared to the nitrogen content of a feed during normal operation. A feed suitable for use as an activation feed can have a nitrogen content of about 250 wppm or less, or about 150 wppm or less, or about 100 wppm or less, or about 50 wppm or less, or about 10 wppm or less, or about 1 wppm or less. In general, lower nitrogen content is preferred, but a feed that has been hydrotreated to remove sulfur only to a desired level, such as at least 100 wppm, may also include some nitrogen. One option for avoiding this difficulty can be to hydrotreat a feed severely enough to reduce the nitrogen amount to a desired level, and then use an additive to increase the sulfur amount to a desired minimum. Suitable sulfur additives for increasing the sulfur content of an activation feed include $H_2S$ and dimethyl disulfide (LAMS).

In various embodiments, an activation feed can have additional characteristics relative to a feed during typical operation. The activation feed can have a similar boiling point range to a feed during operation, or at least one boiling point can be lower by at least about 5° C., or at least about 10° C., or at least about 20° C. The boiling point for the activation feed that is lower than the feed during normal operation can be an initial boiling point, a final boiling point, a T95 boiling value, or another convenient feature of a distillation profile.

An activation feed can also contain a reduced amount of water. In various embodiments, the amount of water in an activation feed can be about 100 wppm or less, or about 50 wppm or less, or about 20 wppm or less. In various embodiments, an activation feedstock may also be suitable for use as a feedstock for drying a catalyst prior to other steps in a catalyst activation procedure.

In some embodiments, the activation feed and/or the feed for use during hydroprocessing can represent a combination of two or more feeds, such as two or more mineral feeds. The content of sulfur, nitrogen, oxygen, and olefins in a feedstock created by blending two or more feedstocks can typically be determined using a weighted average based on the blended feeds. For example, a first feed and a second feed can be blended in a ratio of 80 wt % first feed and 20 wt % second feed. If the first feed has a sulfur content of about 1000 wppm, and the second feed has a sulfur content of about 10 wppm, the resulting blended feed could be expected to have a sulfur content of about 802 wppm.

Types of Catalysts

Many types of hydroprocessing catalysts are composed of one or more metals supported on a substrate material. For example, conventional hydrotreating catalysts often include one or more Group VI and/or Group VIII metals supported on a refractory support. Typical Group VI metals include Mo and W, while typical Group VIII metals include Ni, Co, and Fe. Supports for a hydrotreating catalyst include refractory oxide supports, such as alumina, silica, silica-alumina, titania, zirconia, and combinations thereof.

Catalytic dewaxing relates to the removal and/or isomerization of long chain, paraffinic molecules from feeds. Catalytic dewaxing can be accomplished by selective hydrocracking or by hydroisomerizing these long chain molecules. Hydrodewaxing catalysts can be selected from molecular sieves such as crystalline aluminosilicates (zeolites) or silicoaluminophosphates (SAPOs). In an embodiment, the molecular sieve can be a 14) or 3-D molecular sieve, such as a 10-member ring 1-D molecular sieve. Examples of molecular sieves include ZSM-48, ZSM-23, ZSM-35, Beta, USY, ZSM-5, SAPO-11, SSZ-32, and combinations thereof. Optionally, the dewaxing catalyst can include a binder for the molecular sieve, such as alumina, titania, silica, silica-alumina, zirconia, or a combination thereof. In an embodiment, the binder can be alumina, titania, or a combination thereof. In another embodiment, the binder can be titania, silica, zirconia, or a combination thereof.

One feature of molecular sieves that can impact the activity of the molecular sieve is the ratio of silica to alumina in the molecular sieve. In an embodiment, the molecular sieve can have a silica to alumina ratio of about 200 to 1 or less, or about 120 to 1 or less, or about 100 to 1 or less, or about 90 to 1 or less, or about 75 to 1 or less. In an embodiment, the molecular sieve can have a silica to alumina ratio of at least about 30 to 1, or at least about 50 to 1, or at least about 65 to 1.

The dewaxing catalyst can also include a metal hydrogenation component, such as a Group VIII metal. Suitable Group VIII metals can include Pt, Pd, Co, or Ni. The dewaxing catalyst can include at least about 0.1 wt. % of a Group VIII metal, or at least about 0.3 wt. %, or at least about 0.5 wt. %, or at least about 1.0 wt. %, or at least about 2.5 wt. %, or at least about 5.0 wt. %. Alternatively, the dewaxing catalyst can include about 10.0 wt. % or less of a Group VIII metal, or about 5.0 wt. % or less, or about 2.5 wt. % or less, or about 1.5 wt. % or less. In an embodiment, the dewaxing catalyst can include Pt, Pd, or a combination thereof. In another embodiment, the dewaxing catalyst can include Ni and W, Ni and Mo, Ni, W, and Mo, Co and Mo, or Ni, Co, and Mo.

Some hydrofinishing catalysts also involve crystalline supports. For example, a hydrofinishing or aromatic saturation catalyst can include a Group VIII and/or Group VI metal supported on a bound support from the M41S such as bound MCM-41. Suitable binders for a support from the M41S family, such as MCM-41, can include alumina, silica, or other suitable binders or combinations of binders. One example of a suitable aromatic saturation catalyst is Pt and/or another metal on alumina bound mesoporous MCM-41. Such a catalyst can be impregnated with a hydrogenation metal such as Pt, Pd, another Group VIII metal, a Group VI metal, or a mixture of metals thereof. Preferably, the hydrogenation metal is Pt, Pd, or a combination thereof. In an embodiment, the amount of Group VIII metal is at least 0.1 wt. % per weight of catalyst. Preferably, the amount of Group VIII metal is at least 0.5 wt. %, or at least 0.6 wt. %. In such embodiments, the amount of metals can be 1.0 wt % or less, or 0.9 wt % or less, or 0.75 wt % or less, or 0.6 wt % or less. In still other embodiments, the amount of metals, either individually or in mixtures, is at least 0.1 wt %, or at least 0.25 wt %, or at least 0.5 wt %, or at least 0.6 wt %, or at least 0.75 wt %, or at least 1 wt %. In yet other embodiments, the amount of metals, either individually or in mixtures, is 35 wt % or less, or 20 wt % or less, or 15 wt % or less, or 10 wt % or less, or 5 wt % less.

Due to the presence of the molecular sieve, dewaxing catalysts generally have higher acidity values than catalysts that are supported on an amorphous support, such as alumina. Similarly, some other types of crystalline supports, such as supports from the M41S family, also have an increased acidity. In various embodiments, the methods provided herein are suitable for activation of catalysts that contain molecular sieves or acidic crystalline supports, or catalysts that are otherwise more acidic than dewaxing or hydrofinishing catalysts with amorphous supports.

Activation of Group VIII Noble Metal Catalysts

In some embodiments, liquid phase catalyst activation can be performed for one or more types of Group VIII noble metal catalysts, such as catalysts suitable for use in hydroprocessing of a feedstock to produce a distillate fuel or light lubricating oil. Liquid phase activation typically includes at least two activation time periods. During a first time period, the catalyst is exposed to a liquid activation feed under reducing conditions. The liquid activation feed can be a feed with desirable levels of sulfur, nitrogen, and water. During exposure of the catalyst under reducing conditions, the amount of sulfur can be about 200 wppm or less, or about 50 wppm or less, or about 10 wppm or less. The amount of nitrogen can be about 20 wppm or less, or about 10 wppm or less, or about 1 wppm or less. The low levels of sulfur and nitrogen allow for reduction of the Group VIII metals without interference from contaminants. The amount of water can be about 100 wppm or less, or about 50 wppm or less, or about 20 wppm or less. The low level of water content reduces or minimizes the amount of agglomeration of metals on the catalyst during exposure under reducing conditions.

During a liquid phase startup, the catalyst(s) in a catalyst system can be wetted using the liquid feed for the reducing process. Wetting the catalysts is beneficial for reducing or preventing movement of catalyst within a catalyst bed during introduction of liquid feed. Wetting of the catalysts can be performed at any convenient temperature, such as ambient temperature.

The catalyst system can also be dried to remove excess water. Drying the catalyst can be a part of the catalyst wetting procedure, or a separate set of conditions can be used for drying the catalyst.

After wetting and drying of the catalysts, the catalysts are then reduced in a liquid phase environment. The temperature during the reducing can be from about 200° C. to about 350° C., such as at least about 225° C., or at least about 250° C. Preferably, the maximum temperature during the reducing phase is about 350° C. or less, about 325° C. or less, or about 300° C. or less, or about 275° C. or less. In preferred embodiments, the maximum temperature during the reducing phase is maintained from about 250° C. to about 325° C.

The temperature can vary based on the type of Group VIII noble metal catalyst and the length of the first tune period. The catalyst system is also exposed to a reducing agent such as $H_2$. The partial pressure of $H_2$ can be from about 500 psig (3.45 MPag) to about 3000 psig (20.7 MPag), such as at least about 1000 psig (6.9 MPag), or at least about 1500 psig (10.3 MPag), or about 2500 psig or less (17.2 MPag), or about 2000 psig or less (13.8 MPag). These conditions are maintained while a liquid phase feedstock is flowing through the reactor(s) containing the catalyst system. In some embodiments, the flow rate should be at least about 50% of the design basis flow rate for the reaction system. Suitable feed flow rates range from an LHSV of about 0.1 $hr^{-1}$ to about 5.0 $hr^{-1}$.

The temperatures during the reducing step are higher than the temperatures typically used for a gas phase reducing step. Additionally, a higher partial pressure of $H_2$ is used to facilitate transport of $H_2$ through the liquid environment and to the metals on the catalyst.

After reducing the noble metal catalyst, a second time period can optionally be started for exposing the Group VIII noble metal catalyst to a sulfur compound. The sulfur compound can be introduced by any convenient method. For example, the same liquid activation feed can be used, but the feed can be spiked with a spiking agent such as DMDS. Alternatively, $H_2S$ can be introduced in the gas phase in the reactor or reaction stage. Still another option can be to use a different liquid activation feed that contains sulfur and/or that is spiked with a sulfur compound. Introducing a sulfur compound into the reaction stage allows for sulfidation of metals on catalysts in the reaction stage. For example, if the reaction system includes a first bed of hydrotreating catalyst and a second bed of dewaxing catalyst, introducing the sulfur compound can allow for activation of the hydrotreating catalyst.

When a catalyst system is activated that includes both a hydrotreating catalyst and a Group VIII noble metal catalyst, the reduction of the metals on the Group VIII noble metal catalyst can be performed first. A sulfur-containing feed for sulfiding the catalyst system can then be introduced into the reactor or reactor stages.

Example 1

This example involves activation of a hydrofinishing or aromatic saturation catalyst. The hydrofinishing catalyst included 0.3 wt. % Pt and 0.9 wt. % Pd on an alumina bound MCM-41 support. The MCM-41 and alumina had a relative weight ratio of 65:35 in the support.

Samples of catalyst were activated using both a gas phase activation procedure comparative) and a liquid phase activation procedure. In the gas phase activation procedure, 5 $cm^3$ of the catalyst was loaded into a pilot plant upflow reactor. The catalyst was dried using $N_2$ with an $H_2O$ content of less than 100 wppm at 260° C. for 3 hours. The catalyst was then reduced in the presence of a partial pressure of 1000 psig (6.9 MPag) $H_2$ with all $H_2O$ content of less than 100 wppm for 24 hours. The temperature during reducing with $H_2$ was 260° C. The catalyst was then exposed to a hydrotreated, dewaxed distillate feed containing 210 wppm of sulfur for 24 hours at a liquid hourly space velocity (LIM) of about 2.0 $hr^{-1}$. The temperature was increased to 275° C. for the exposure to the sulfur-containing feed. The partial pressure of 1000 psig (6.9 MPag) $H_2$ was continued during exposure to the sulfur-containing feed. After this start-up procedure, the gas-phase activated catalyst sample was ready for processing of a feedstock.

For the liquid phase activation, 5 $cm^3$ of catalyst was loaded into the same type of pilot plant reactor. The catalyst was then exposed to the sulfur-containing (210 wppm) hydrotreated distillate feed mentioned above for the gas mo phase activation. Initially the distillate feed was introduced into the upflow reactor at ambient temperature. A hydrogen pressure of about 1000 psig (6.9 MPag) of $H_2$ was also introduced into the reactor. The distillate feed was introduced at a slow rate so that the reactor became flooded after 24 hours. The feed rate as then increased to an LHSV of 2.0 $hr^{-1}$ with a sufficient hydrogen flow to maintain the hydrogen partial pressure at 1000 psig (6.9 MPag) $H_2$. The temperature was ramped up to a temperature of 275° C. The feed flow, hydrogen partial pressure, and temperature were maintained for about 24 hours. The liquid-phase activated catalyst sample was then ready for processing of a feedstock.

The gas-phase activated and liquid-phase activated catalyst samples were then used to perform aromatic saturation on a feed similar to the sulfur-containing feed used during the activations. The feed for aromatic saturation was a hydrotreated distillate that contained 210 wppm of sulfur and 415 mmoles/kg of aromatics. The catalysts were each exposed to the feed at 275° C. at an LHSV of 2.0 $hr^{-1}$ with an $H_2$ partial pressure of 1000 psig (6.9 MPag).

FIG. 1 shows results from aromatic saturation of the feed over each catalyst for a series of runs. The lower data series of open symbols corresponds to the liquid phase activated catalyst, while the upper data series of filled symbols corresponds to the gas-phase activated catalyst. As shown in FIG. 1, the liquid-phase activated catalyst showed equal or better saturation of aromatics as compared to the gas-phase activated catalyst.

Example 2

This example involves activation of a Group VIII metal hydrotreating catalyst, a dewaxing catalyst, and a hydrofinishing or aromatic saturation catalyst that are located in a single reactor stage using both a gas-phase activation procedure and a liquid-phase activation procedure. For both procedures, the catalyst loaded in the reactor stage included 3.3 $cm^3$ of a conventional Group VI/Group VIII hydrotreating catalyst on an alumina support; 10 $cm^3$ of a dewaxing catalyst including 0.6 wt. % Pt on an alumina-bound ZSM-48 support. The relative weight ratio of ZSM-48 to alumina in the support was 65:35. The ZSM-48 had a silica to alumina ratio of about 110 or less. The hydrofinishing catalyst included 0.3 wt. % Pt and 0.9 wt. % Pd supported on an alumina bound MCM-41 support with a 65:35 ratio of MCM-41 to alumina. The hydrotreating and dewaxing catalysts were located in a first pilot reactor while the hydrofinishing catalyst was located in a second reactor. The reactors were cascaded together to produce a single reaction stage.

For the catalyst system subjected to gas-phase activation, the catalyst system was initially dried using $N_2$. The catalyst system was then exposed to 2000 psig (13.8 MPag) of $H_2$ at 320° C. for 24 hours to reduce the metals on the dewaxing and hydrofinishing catalysts. After the drying and $H_2$ exposure, the catalyst system was exposed to a heavy neutral hydrocrackate at 320° C. for about 24 hours. The 2000 psig (13.8 MPag) of $H_2$ was maintained during this exposure to the heavy neutral hydrocrackate. Relative to the amount of dewaxing catalyst, the LHSV of the heavy neutral hydrocrackate was 1.0 $hr^{-1}$. Relative to the amount of hydrofinishing catalyst, the LHSV of the heavy neutral hydrocrackate was 2.0 $hr^{-1}$. The gas-activated catalyst system was then ready for use.

For the liquid-activated catalyst system, the catalyst system was exposed to a diesel boiling range feed with a sulfur content of less than about 50 wppm at ambient temperature. Initially the distillate feed was introduced into the upflow reactor at ambient temperature. A hydrogen pressure of about 1000 psig (6.9 MPag) of $H_2$ was also introduced into the reactor. The distillate feed was introduced at a slow rate so that the reactor became flooded after 24 hours. The LHSV of the diesel feed relative to the dewaxing catalyst was then increased to about 1.0 hr while ramping the temperature up to 200° C. As noted above, an LHSV relative to the dewaxing catalyst of 1.0 $hr^{-1}$ corresponds to an LHSV relative to the hydrofinishing catalyst of 2.0 $hr^{-1}$. The $H_2$ partial pressure was maintained at 2000 psig (13.8 MPag). This condition was then maintained for another 24 hours. The liquid activation feed was then changed to the heavy neutral hydrocrackate as described above. The LHSV was 1.0 $hr^{-1}$ relative to the dewaxing catalyst. The catalyst system was exposed to the heavy neutral hydrocrackate in the presence of 2000 psig (13.8 MPag) of $H_2$ for 24 hours. During this time, the temperature of the catalyst system was ramped to 320° C. The liquid-phase activated catalyst system was then ready for use.

Figure 2:
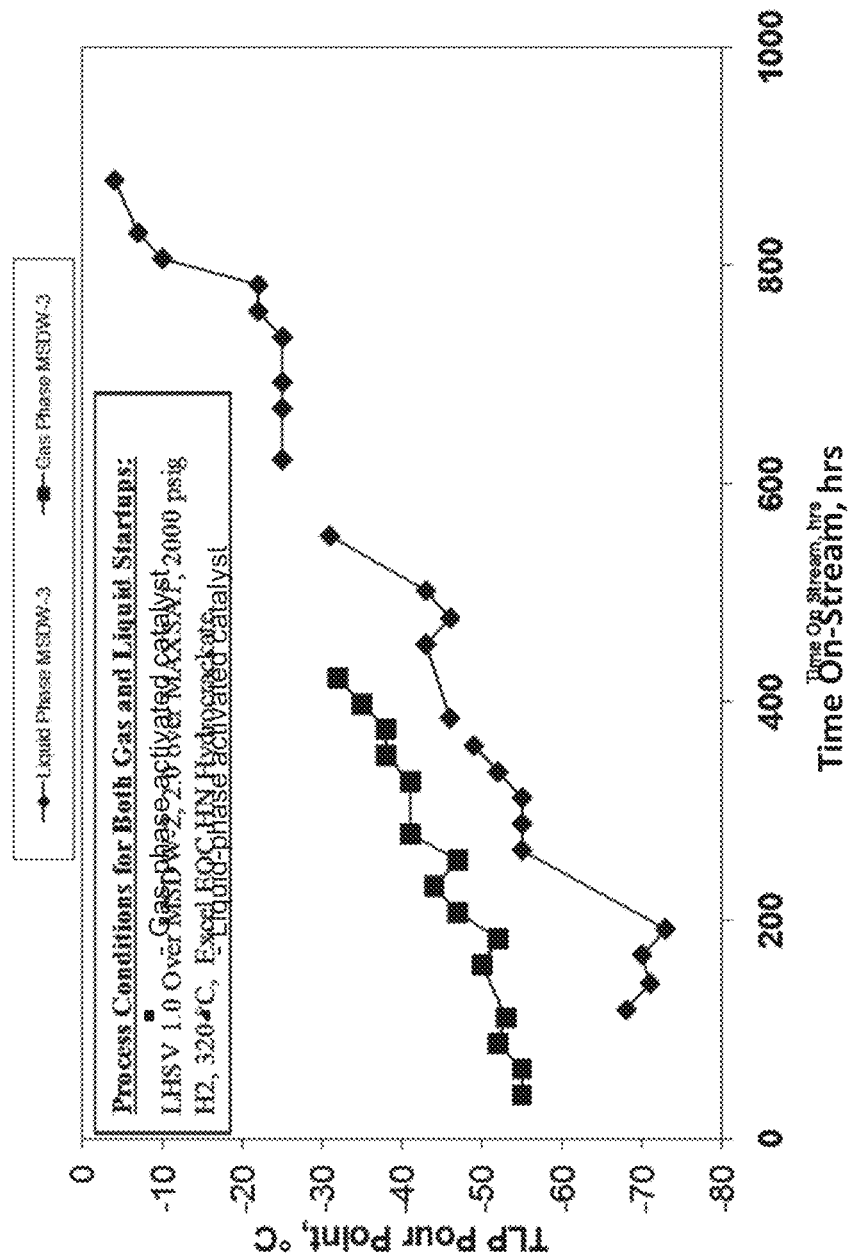
FIG. 2 shows results from hydroprocessing of a feed using catalyst systems activated by various procedures.
Figure 3:
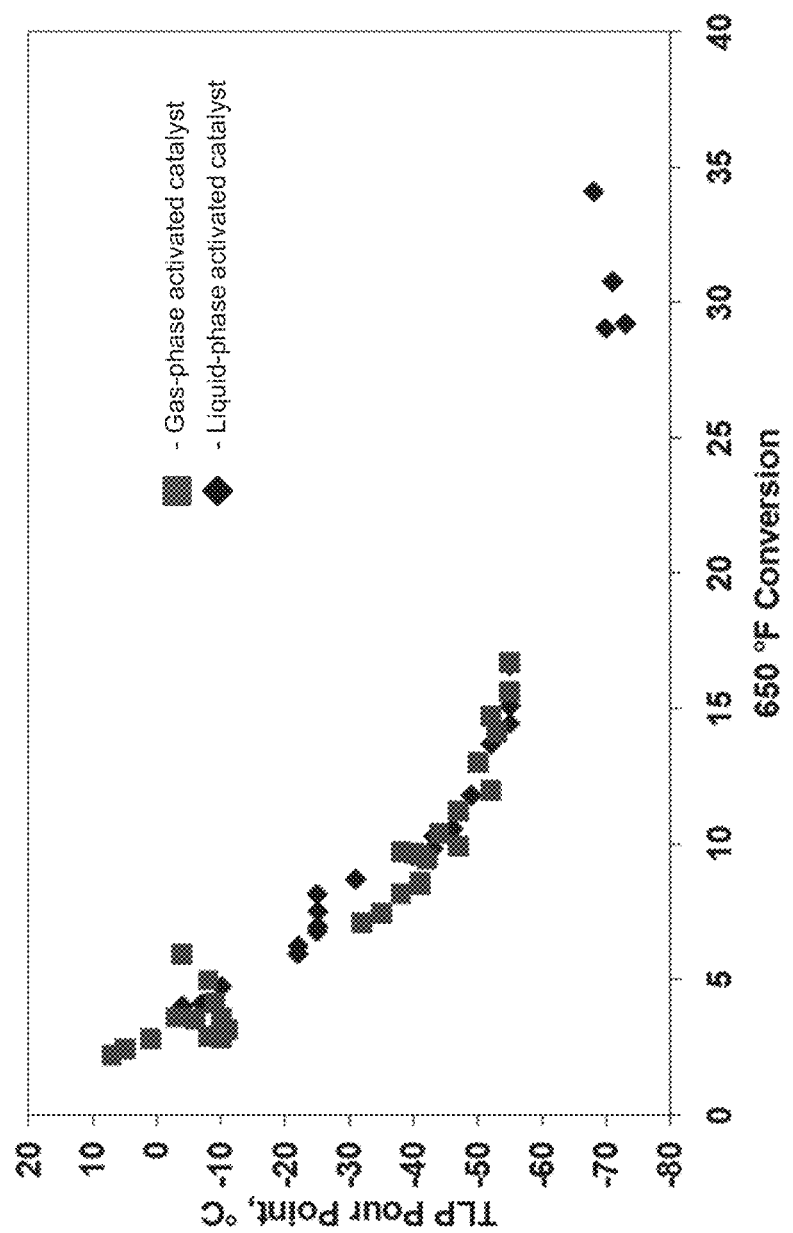
FIG. 3 shows results from hydroprocessing of a feed using catalyst systems activated by various procedures.

The gas-phase activated and liquid-phase activated catalyst systems were used to process a heavy neutral hydrocrackate feed for pour point improvement. The heavy neutral hydrocrackate feed was exposed to the catalyst systems at a temperature of 320° C. with an $H_2$ partial pressure of 2000 psig (13.8 MPag). The LHSV of the feed was 1.0 $hr^{-1}$ relative to the dewaxing catalyst and 2.0 $hr^{-1}$ relative to the hydrofinishing catalyst. FIG. 2 shows the pour point results of processing the heavy neutral hydrocrackate feed over both catalyst systems over time. The lower axis in FIG. 2 corresponds to the number of days on feed for a catalyst. The upper data set of square symbols corresponds to the gas phase activation procedure while the lower data set of diamond symbols corresponds to the liquid phase activation procedure. As shown in FIG. 2, the liquid-phase activated catalyst system provided a significantly lower pour point for the feed at the beginning of processing. This trend of providing a lower pour point continued during the course of the processing run. This improved pour point reduction indicates that the liquid-phase activation provided superior activity for the catalyst system. FIG. 3 confirms this improved activity by showing the relationship between pour point and conversion. Once again, the square symbols correspond to the gas phase activated system while the diamond symbols correspond to the liquid phase activated system. As shown in FIG. 3, the relationship between pour point and feed conversion is similar for both catalysts. This indicates that the liquid phase activated catalyst is more active due to providing the same qualitative type of reactivity at a lower temperature. The increased activity of the liquid-phase activated catalyst does not appear to be due to an increase in general cracking of the feed. In other words, at the beginning of a processing run, the liquid-phase activated catalyst system could be used at a lower initial temperature than the gas-phase activated catalyst system while still achieving the same desired pour point. This additional activity for the liquid-phase activated catalyst system, however, does not result in additional feed conversion for a given amount of pour point reduction.

ADDITIONAL EMBODIMENTS

Embodiment 1

A method for activating a catalyst system, comprising: exposing a catalyst system to a first liquid activation feed under effective reducing conditions for at least about 24 hours, the catalyst system including at least one catalyst that comprises a Group VIII non-noble metal on an amorphous support and at least one catalyst that comprises a Group VIII noble metal on an acidic support, the effective reducing conditions including a hydrogen partial pressure of at least about 500 psig (145 MPag) and a temperature of at least about 200° C.; and exposing the catalyst system to a second liquid activation feed under effective sulfiding conditions.

Embodiment 2

The method of embodiment 1, wherein the catalyst with an amorphous support is a hydrotreating catalyst.

Embodiment 3

The method of any of the above embodiments, wherein the catalyst comprising a Group VIII noble metal on an acidic support comprises a dewaxing catalyst with Pt, Pd, or a combination thereof on a support including a molecular sieve.

Embodiment 4

The method of any of the above embodiments, wherein the catalyst comprising a Group VIII noble metal on an acidic support comprises a hydrofinishing catalyst with Pt, Pd, or a combination thereof on a support comprising an M41S family support.

Embodiment 5

The method of any of the above embodiments, wherein the catalyst system is provided in a single reactor.

Embodiment 6

The method of any of the above embodiments, wherein first liquid activation feed comprises a distillate boiling range feed with a sulfur content of less than about 100 wppm and a water content of less than about 100 wppm.

Embodiment 7

The method of any of the above embodiments, wherein first liquid activation feed has a nitrogen content of less than about 250 wppm.

Embodiment 8

The method of any of the above embodiments, wherein the second liquid activation feed comprises a distillate boiling range feed with a sulfur content of at least about 200 wppm.

Embodiment 9

The method of any of the above embodiments, wherein the second liquid activation feed comprises the first liquid activation feed spiked with a sulfur-containing compound.

Embodiment 10

The method of any of the above embodiments, wherein the effective sulfiding conditions comprise a temperature of at least about 275° C., a hydrogen partial pressure of at least about 500 psig (3.45 MPag).

Embodiment 11

The method of any of the above embodiments, wherein the effective reducing conditions comprise a maximum temperature of about 350° C. or less.

Embodiment 12

The method of embodiment 11, wherein the effective sulfiding conditions include a temperature that is at least about 15° C. greater than the temperature of the effective reducing conditions.

Embodiment 13

The method of any of the above embodiments, wherein the effective reducing conditions comprise a maximum temperature of from about 250° C. to about 325° C.

Embodiment 14

The method of any of the above embodiments, wherein the effective reducing conditions include an $H_2$ partial pressure of at least about 1000 psig (6.9 MPag).

Embodiment 15

The method of any of the above embodiments, wherein the catalyst system comprises a hydrotreating catalyst, a dewaxing catalyst that includes a Group VIII noble metal on a support comprising a molecular sieve, and a hydrofinishing catalyst that includes a Group VIII noble metal on a support comprising an M41S family support.

Embodiment 16

The method of any of the above embodiments, wherein the catalyst comprising a Group VIII metal on an amorphous support comprises Ni, Co, or a combination thereof on an amorphous support.

Embodiment 17

The method of any of the above embodiments, wherein the catalyst comprising a Group VIII metal on an amorphous support further comprises Mo or W on the amorphous support.

Embodiment 18

The method of any of the above embodiments, wherein the catalyst system further comprises a hydrofinishing catalyst comprising a Group VIII noble metal on an acidic crystalline support.

What is claimed is:

1. A method for activating a catalyst system, comprising:
   exposing a catalyst system to a first liquid activation feed under effective reducing conditions for at least about 24 hours to reduce an oxidation state of the catalyst system, the catalyst system including at least one catalyst that comprises a Group VIII non-noble metal on an amorphous support and at least one catalyst that comprises a Group VIII noble metal on an acidic support, the effective reducing conditions including a hydrogen partial pressure of at least about 500 psig (3.45 MPag) and a temperature of at least about 200° C.; and
   exposing the catalyst system to a second liquid activation feed under effective sulfiding conditions to activate the Group VIII non-noble metal catalyst component, while retaining activity of the Group VIII noble metal catalyst component.

2. The method of claim 1, wherein the catalyst with an amorphous support is a hydrotreating catalyst.

3. The method of claim 1, wherein the catalyst comprising a Group VIII noble metal on an acidic support comprises a dewaxing catalyst with Pt, Pd, or a combination thereof on a support including a molecular sieve.

4. The method of claim 1, wherein the catalyst comprising a Group VIII noble metal on an acidic support comprises a hydrofinishing catalyst with Pt, Pd, or a combination thereof on a support comprising an M41S family support.

5. The method of claim 1, wherein the catalyst system is provided in a single reactor.

6. The method of claim 1, wherein first liquid activation feed comprises a distillate boiling range feed with a sulfur content of less than about 100 wppm and a water content of less than about 100 wppm.

7. The method of claim 6, wherein first liquid activation feed has a nitrogen content of less than about 250 wppm.

8. The method of claim 1, wherein the second liquid activation feed comprises a distillate boiling range feed with a sulfur content of at least about 200 wppm.

9. The method of claim 1, wherein the second liquid activation feed comprises the first liquid activation feed spiked with a sulfur-containing compound.

10. The method of claim 1, wherein the effective sulfiding conditions comprise a temperature of at least about 275° C., a hydrogen partial pressure of at least about 500 psig (3.45 MPag).

11. The method of claim 1, wherein the effective reducing conditions comprise a maximum temperature of about 350° C. or less.

12. The method of claim 11, wherein the effective sulfiding conditions include a temperature that is at least about 15° C. greater than the temperature of the effective reducing conditions.

13. The method of claim 1, wherein the effective reducing conditions comprise a maximum temperature of from about 250° C. to about 325° C.

14. The method of claim 1, wherein the effective reducing conditions include an $H_2$ partial pressure of at least about 1000 psig (6.9 MPag).

15. The method of claim 1, wherein the catalyst system comprises a hydrotreating catalyst, a dewaxing catalyst that includes a Group VIII noble metal on a support comprising a molecular sieve, and a hydrofinishing catalyst that includes a Group VIII noble metal on a support comprising an M41S family support.

16. The method of claim 1, wherein the catalyst comprising a Group VIII non-noble metal on an amorphous support comprises Ni, Co, or a combination thereof on an amorphous support.

17. The method of claim 16, wherein the catalyst comprising a Group VIII non-noble metal on an amorphous support further comprises Mo or W on the amorphous support.

18. A method for activating a catalyst system, comprising:
    exposing a catalyst system to a first liquid activation feed under effective reducing conditions for at least about 24 hours to reduce an oxidation state of the catalyst system, the catalyst system including at least one catalyst that comprises a Group VIII non-noble metal on an amorphous support, a dewaxing catalyst that comprises a Group VIII noble metal on a molecular sieve, and a hydrofinishing catalyst comprising a Group VIII noble metal on an acidic crystalline support, the effective reducing conditions including a hydrogen partial pressure of at least about 500 psig (3.45 MPag) and a temperature from about 200° C. to about 350° C.; and
    exposing the catalyst system to a second liquid activation feed under effective sulfiding conditions to activate the Group VIII non-noble metal catalyst component, while retaining activity of the Group VIII noble metal catalyst component.

19. The method of claim 1, wherein the method consists essentially of the two exposing steps.

20. The method of claim 18, wherein the method consists essentially of the two exposing steps.

* * * * *